US008607359B2

(12) United States Patent
Pratt et al.

(10) Patent No.: US 8,607,359 B2
(45) Date of Patent: *Dec. 10, 2013

(54) REMOVABLE HARD DISK WITH FRONT PANEL INPUT

(75) Inventors: Thomas L. Pratt, Austin, TX (US); Ajay Agarwal, Austin, TX (US); Winston Bumpus, Austin, TX (US); William A. Curtis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1025 days.

This patent is subject to a terminal disclaimer.

(21) Appl. No.: 11/625,434

(22) Filed: Jan. 22, 2007

(65) Prior Publication Data

US 2008/0178283 A1 Jul. 24, 2008

(51) Int. Cl.
*G06F 21/00* (2013.01)

(52) U.S. Cl.
USPC .................. 726/28; 726/26; 726/27; 726/29

(58) Field of Classification Search
USPC ......................................... 726/28, 26, 27, 29
See application file for complete search history.

(56) References Cited

U.S. PATENT DOCUMENTS

| 5,748,744 A | 5/1998 | Levy et al. ........................ 380/52 |
| 5,757,919 A | 5/1998 | Herbert et al. .................. 380/25 |
| 5,845,066 A * | 12/1998 | Fukuzumi ........................ 726/19 |
| 5,930,358 A | 7/1999 | Rao .................................... 380/4 |
| 5,956,633 A | 9/1999 | Janhila .......................... 455/410 |
| 6,671,744 B1 * | 12/2003 | Naito et al. .................... 719/321 |
| 6,868,160 B1 | 3/2005 | Raji ................................. 380/30 |
| 6,871,063 B1 | 3/2005 | Schiffer ........................ 455/410 |
| 6,871,278 B1 | 3/2005 | Sciupac ........................ 713/185 |
| 6,917,490 B2 | 7/2005 | Pratt et al. .................. 360/78.08 |
| 6,957,330 B1 | 10/2005 | Hughes .......................... 713/163 |
| 6,971,016 B1 | 11/2005 | Barnett .......................... 713/182 |
| 6,973,187 B2 | 12/2005 | Gligor et al. ..................... 380/28 |
| 6,980,659 B1 | 12/2005 | Elliott ........................... 380/277 |
| 7,043,641 B1 | 5/2006 | Martinek et al. .............. 713/187 |
| 7,054,845 B2 | 5/2006 | Oshima et al. ................... 705/78 |
| 7,058,969 B2 | 6/2006 | Sambati ............................ 726/2 |
| 7,069,447 B1 | 6/2006 | Corder .......................... 713/189 |
| 7,114,082 B2 | 9/2006 | Klein ............................. 713/193 |
| 7,130,426 B1 | 10/2006 | Cha et al. ....................... 380/201 |
| 7,140,044 B2 | 11/2006 | Redlich et al. ................... 726/27 |
| 7,146,495 B2 | 12/2006 | Baldwin et al. ............... 713/100 |
| 7,146,644 B2 | 12/2006 | Redlich et al. ................... 726/27 |
| 7,149,901 B2 | 12/2006 | Herbert et al. ................ 713/190 |
| 7,152,165 B1 | 12/2006 | Maheshwari et al. ........ 713/193 |
| 7,152,693 B2 | 12/2006 | Man et al. ...................... 173/183 |
| 7,159,776 B2 | 1/2007 | Pratt ............................. 235/454 |
| 7,162,647 B2 | 1/2007 | Osaki ............................ 713/193 |

(Continued)

*Primary Examiner* — Bradley Holder (74) *Attorney, Agent, or Firm* — Terrile, Cannatti, Chambers & Holland, LLP; Stephen A. Terrile (57) ABSTRACT

A system and method is disclosed for authenticating a removable data storage device (RDSD) by using a trusted information module (TIM) to control access to data files stored on the RDSD. A security information input receiver receives identity verification factors from a user and provides the identity verification factors to the TIM for processing. In some embodiments of the invention, the TIM uses identity verification factors in cryptographic operation to authenticate the user, the RDSD and the information processing system to each other. The TIM then performs similar operations with the contents of one or more authorization files to control access and usage of the data files stored on the RDSD.

10 Claims, 6 Drawing Sheets

(56) References Cited

U.S. PATENT DOCUMENTS

| | | | |
|---|---|---|---|
| 2002/0157010 A1 | 10/2002 | Dayan et al. | 713/191 |
| 2004/0039969 A1 | 2/2004 | Pratt et al. | 714/42 |
| 2004/0061970 A1 | 4/2004 | Pratt et al. | 360/78.08 |
| 2005/0039013 A1* | 2/2005 | Bajikar et al. | 713/172 |
| 2005/0066199 A1* | 3/2005 | Lin | 713/201 |
| 2005/0077351 A1* | 4/2005 | De Jong | 235/380 |
| 2006/0026417 A1 | 2/2006 | Furusawa et al. | 713/2 |
| 2006/0034581 A1 | 2/2006 | Konetski et al. | 386/46 |
| 2006/0136717 A1* | 6/2006 | Buer et al. | 713/155 |
| 2006/0277598 A1* | 12/2006 | Ahn | 726/5 |
| 2006/0288185 A1 | 12/2006 | Brisse et al. | 711/170 |
| 2007/0038856 A1* | 2/2007 | Ali et al. | 713/164 |
| 2007/0050398 A1* | 3/2007 | Mochizuki | 707/102 |
| 2007/0165253 A1* | 7/2007 | Usui et al. | 358/1.9 |
| 2007/0168677 A1* | 7/2007 | Kudo et al. | 713/185 |
| 2007/0172222 A1* | 7/2007 | Kakutani et al. | 396/266 |
| 2007/0209064 A1* | 9/2007 | Qin et al. | 726/5 |
| 2007/0214369 A1* | 9/2007 | Roberts et al. | 713/192 |
| 2008/0034421 A1* | 2/2008 | Ahn et al. | 726/17 |
| 2008/0169350 A1* | 7/2008 | Audebert et al. | 235/492 |

* cited by examiner

REMOVABLE HARD DISK WITH FRONT PANEL INPUT

BACKGROUND OF THE INVENTION

1. Field of the Invention

The present invention relates in general to the field of information handling systems and, more particularly, to ensuring the security and integrity of data on a removable storage system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The diversity and amount of data managed by information handling systems continues to grow for consumer, corporate and government markets alike. This growth is driving the need for cost effective, scalable storage systems that can be quickly and easily configured for a wide variety of uses and applications. One approach to address these needs is the use of self-contained, transportable mass storage units that easily attach to a variety of systems. Another popular approach consists of mass storage devices that are mounted in standardized, interchangeable modules that can be transferred between systems. These interchangeable mass storage units are commonly used in the implementation of redundant array of independent disks (RAID) subsystems, which are already popular in corporate and government environments and are now gaining consumer acceptance as well.

RAID subsystems can share or replicate data across multiple disk drives, any of which can typically be removed and replaced ("hot swapped") while the system is running. While a RAID controller can check a disk's information to confirm its assignment to a particular array or group, it can neither verify the authenticity of the disk, the validity of the data it contains, or whether the data is authorized to be used by the system. Furthermore, no solution currently exists for a user to enter a security code or other means of authentication directly into a removable mass storage device to first authenticate it to a system when it is attached and then securely control the bi-directional transfer of the data. As a result, the ability to easily remove, transport and attach disk storage devices to other systems without the means to control the transfer of the data they contain creates security vulnerabilities. For example, even if the information on a disk drive is encrypted, access to the device itself is not secured. The lack of access control devices such as a trusted information module allows the disk to be removed and its contents copied or mirrored to another system, which can then be used in an attempt to decrypt the data. Accordingly, removable and portable storage systems also need to securely and reliably sustain information integrity and availability, regardless of the system they are attached to.

SUMMARY OF THE INVENTION

In accordance with the present invention, a system and method is disclosed for authenticating a removable data storage device (RDSD) by using a security information input receiver to convey one or more user identity verification factors to a trusted information module (TIM) for processing. In various embodiments of the invention, an RDSD is contained in an enclosure comprising a disk storage drive, a TIM, and one or more security information input receivers. The enclosure also includes one or more interfaces, and one or more connectors that allow the RDSD to be connected to an information handling system. In these embodiments, user identity verification factors are received by one or more security information input receivers for conveyance to the TIM. In an embodiment of the invention, user identity verification factors are manually entered into a key pad or a touch-sensitive screen. In another embodiment, user identity verification factors are automatically entered using a radio frequency identification device (RFID) input receiver. In yet another embodiment, user identity verification factors are automatically entered using a biometric input receiver.

In various embodiments of the invention, the TIM comprises a non-volatile storage medium operable to securely store passwords, digital keys, digital certificates and other security credentials. The TIM receives these user identity verification factors for use in subsequent operations to authenticate the user, the RDSD, and an information processing system to each other. In one embodiment of the invention, the TIM comprises a removable smart card internally coupled to a predetermined interface comprising a disk storage device. In another embodiment, the TIM comprises a removable smart card that is externally-coupled to a predetermined interface. In yet another embodiment, the TIM comprises a removable smart card that is externally coupled to a predetermined interface that is accessible from outside the RDSD enclosure. In another embodiment, the TIM is externally coupled to a predetermined interface using a universal serial bus (USB) connection.

In some embodiments of the invention, the RDSD is connected to an information handling system and the TIM initiates a plurality of authentication and authorization processes. Once connected, the TIM generates user prompts on a display screen requesting the application of user identity verification factors using a security information input receiver such as a keypad or biometric sensor. Once the requested identity verification factors have been received, the TIM uses the contents of one or more authentication files and the security mechanisms stored in its non-volatile storage medium to perform comparison and cryptographic operations. If the user is successfully authenticated, the TIM uses the contents of one or more authentication files and the security mechanisms stored in its non-volatile storage medium to perform similar comparison and cryptographic operations to authenticate the RDSD to the information handling system. Upon completion of the comparison and cryptographic operations, a visual acknowledgement may be conveyed to the user via a display screen 216 asserting the authenticity of RDSD 108. Once the RDSD has been successfully authenticated, the TIM performs similar comparison and cryptographic operations with the contents of one or more authorization files to authorize the access and usage of the data files comprising the RDSD.

In another embodiment of the invention, the TIM performs other cryptographic operations to determine whether the integrity of data files has been compromised. The integrity status of the files is then digitally conveyed to the predetermined information handling system and visually displayed to the user via a display screen. In another embodiment, removal of the TIM prevents an information handling system from accessing the data files comprising the RDSD. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method is disclosed for authenticating a removable data storage device (RDSD) using a security information input receiver to convey user identity verification factors to a trusted information module (TIM) for processing. In various embodiments of the invention, the RDSD is contained in an enclosure along with a disk storage drive, a TIM, and one or more security information input receivers. The enclosure also includes one or more interfaces and one or more connectors that allow the RDSD to be connected, disconnected and reconnected to an information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
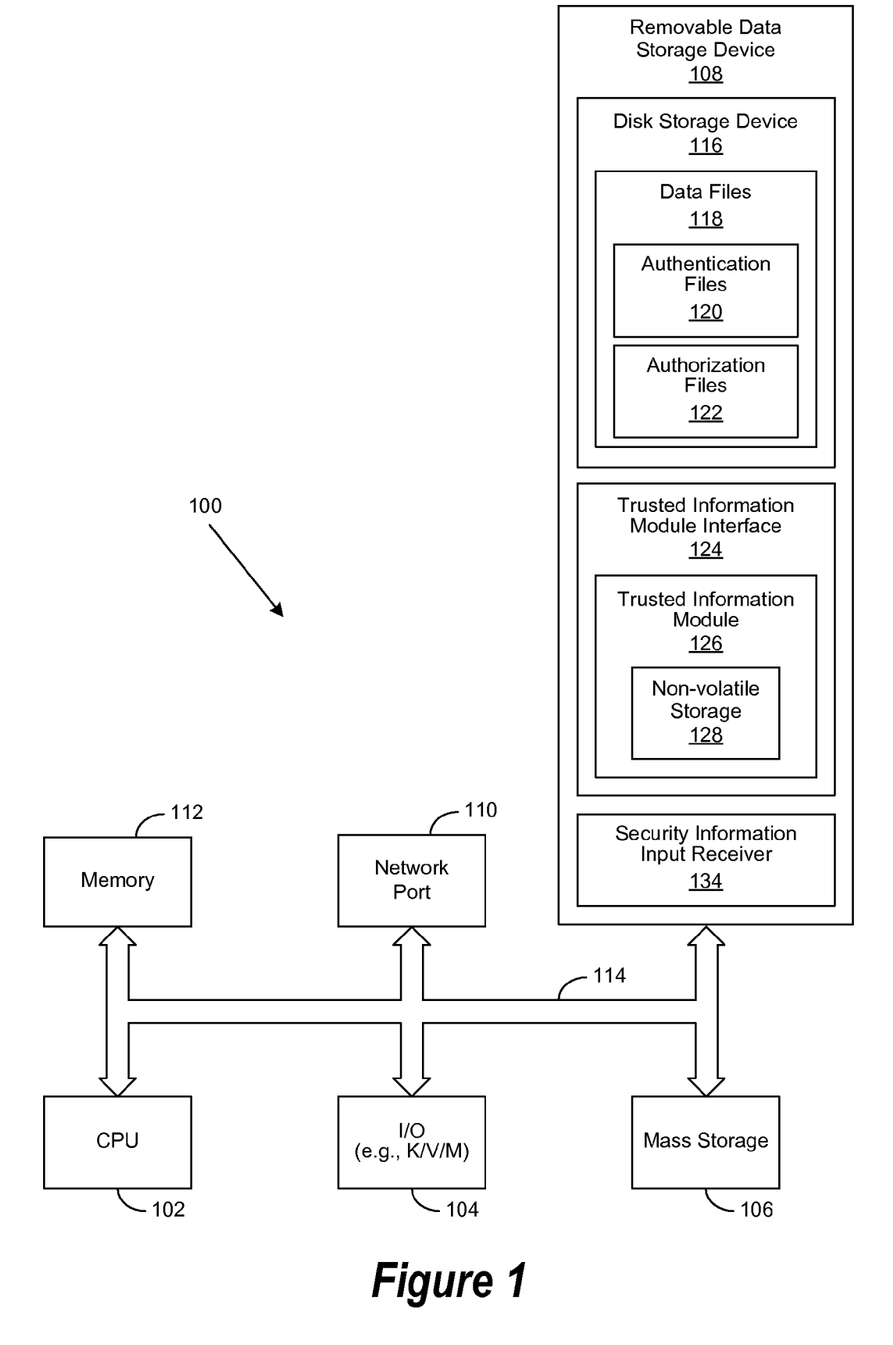
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, mass storage 106, various other subsystems, such as removable data storage device 108, network port 110 operable to connect to a network, and system memory 112, all interconnected via one or more buses 114. Removable data storage device 108 comprises disk storage device 116, trusted information module interface 124, and security information input receiver 134. Trusted information module interface 124 further comprises trusted information module (TIM) 126, which comprises non-volatile storage medium 128, operable to securely store passwords, digital keys, digital certificates and other security credentials. Disk storage device 116 comprises a plurality of data files 118, which further comprise one or more authentication files 120, and one or more authorization files 122.

Figure 2:
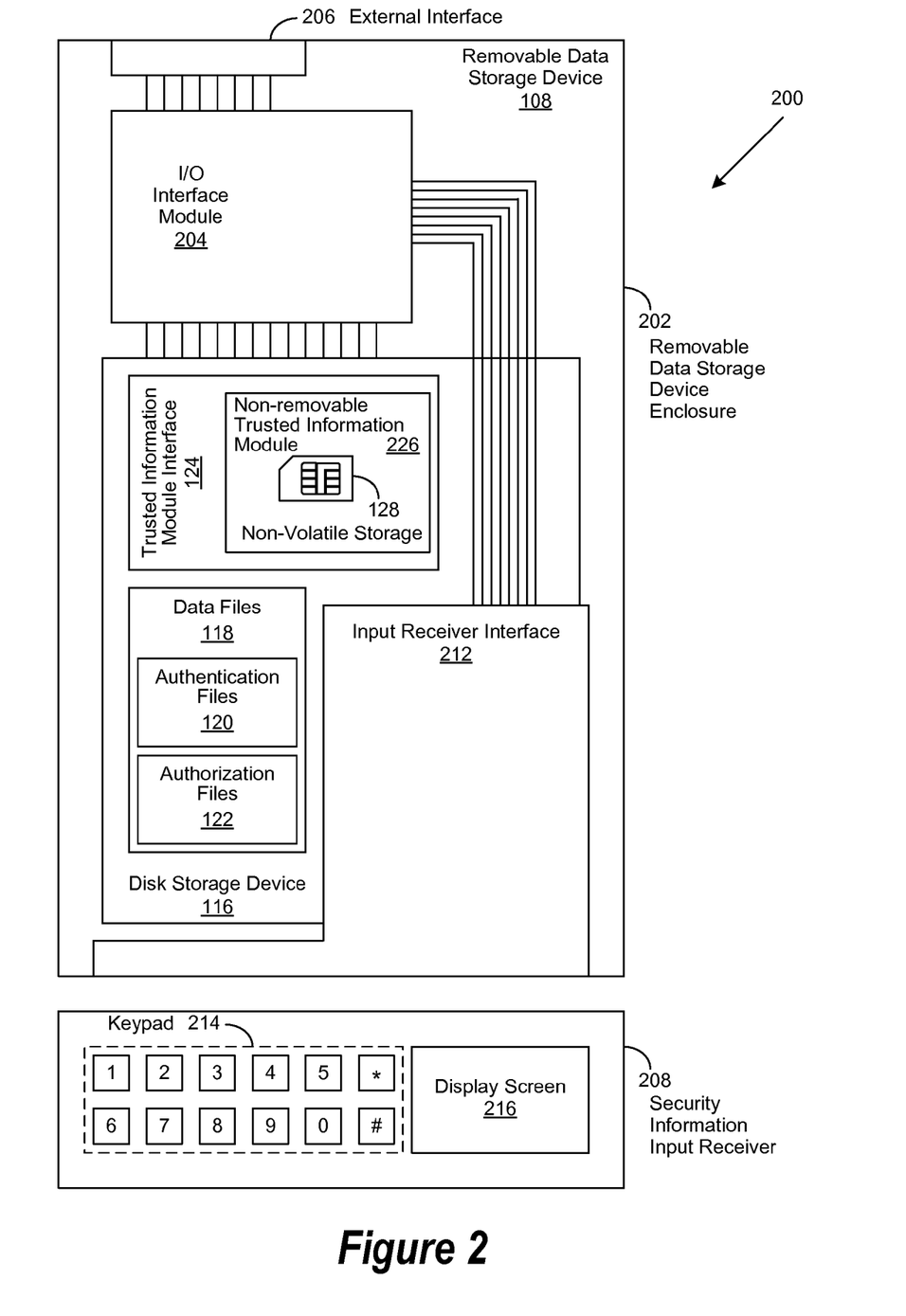
FIG. 2 is a generalized block diagram illustrating a security information input receiver as implemented with an embedded trusted information module (TIM) in accordance with an embodiment of the invention for user authentication of a removable data storage device (RDSD)

FIG. 2 is a generalized block diagram illustrating a security information input receiver as implemented with an internally-coupled TIM 200 in accordance with an embodiment of the invention for user authentication of a removable data storage device (RDSD). In this embodiment, RDSD 108 comprises disk storage device 116, RDSD enclosure 202, input/output (I/O) interface module 204, external interface 206, and input receiver interface 212, which is coupled to RDSD security information input receiver 208. Disk storage device 116 comprises an internally-coupled TIM interface 124, further comprising the internally-coupled, non-removable TIM 226. In one embodiment, internally-coupled TIM 226 is physically coupled to TIM interface 124. The internally-coupled, non-removable TIM 226 comprises non-volatile storage medium 128, operable to securely store passwords, digital keys, digital certificates and other security mechanisms. Disk storage device 116 further comprises a plurality of data files 118, one or more authentication files 120, and one or more authorization files 122. RDSD security information input receiver 208 comprises keypad 214 and display screen 216.

In an embodiment of the invention, the internally-coupled, non-removable TIM 226 initiates a plurality of authentication and authorization processes when the RDSD 108 is first connected to an information handling system. Connection of the RDSD 108 to the information handling system results in the internally-coupled, non-removable TIM 226 generating user prompts on display screen 216 requesting predetermined user actions such as entering required authentication or authorization codes using keypad 214. Once the requested codes have been entered using keypad 214, the internally-coupled, non-removable TIM 226 initiates comparison and authentication operations to authenticate the user using the entered codes and the passwords, digital keys, digital certificates and other security mechanisms securely stored in non-volatile storage medium 128.

If the user is successfully authenticated, then authentication of the RDSD 108 to the information handling system begins with the internally-coupled, non-removable TIM 226 initiating comparison and authentication operations using the contents of one or more authentication files 120 and the passwords, digital keys, digital certificates and other security mechanisms securely stored in non-volatile storage medium 128. Cryptographic operations familiar to those of skill in the art are then performed by the internally-coupled, non-removable TIM 226 to authenticate RDSD 108. If successful, the internally-coupled, non-removable TIM 226 conveys a message asserting the authenticity of RDSD 108 to the information handling system and visual acknowledgement is provided to the user via display screen 216. In one embodiment, the authenticity of applications (e.g., their associated software license) comprising the system is validated by the internally-coupled, non-removable TIM 226 performing similar comparison and authentication operations. Once authenticated, the internally-coupled, non-removable TIM 226 conveys a message asserting the authenticity of the software applications to the user via display screen 216.

Once the RDSD 108 has been authenticated, the internally-coupled, non-removable TIM 226 performs similar comparison and cryptographic operations with the contents of one or more authorization files 122 to authorize the information handling system's access and usage of the plurality of data files 118. In one embodiment of the invention, the internally-coupled, non-removable TIM 226 performs other cryptographic operations to determine whether the integrity of data files 118 has been compromised. Their integrity status is then digitally conveyed to the information handling system and visually displayed to the user via display screen 216. In another embodiment, removal of the internally-coupled, non-removable TIM 226 prevents the information handling system from accessing the plurality of data files 118 comprising RDSD 108.

Figure 3:
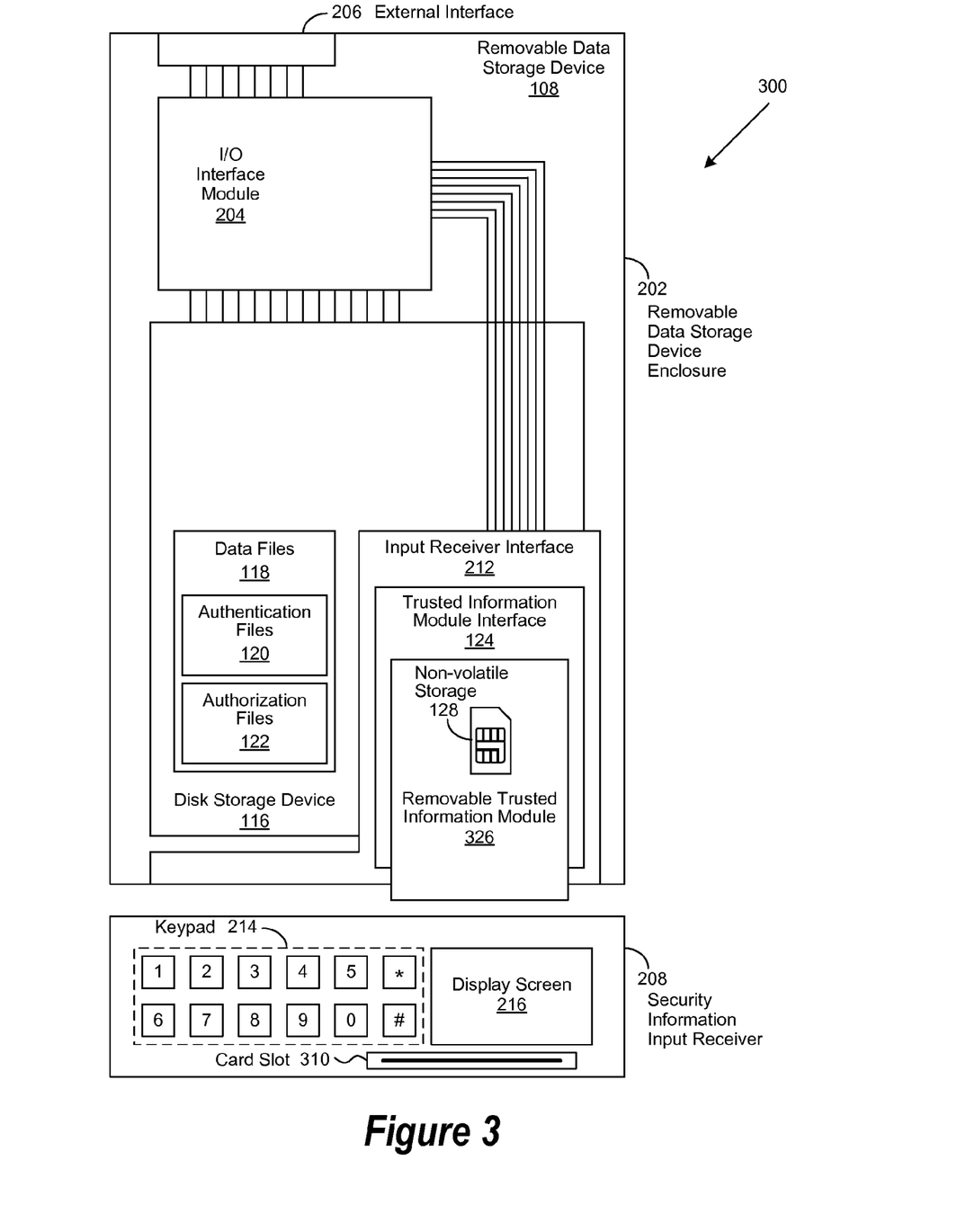
FIG. 3 is a generalized block diagram illustrating a security information input receiver as implemented with an externally-coupled TIM in accordance with an embodiment of the invention for user authentication of an RDSD.

FIG. 3 is a generalized block diagram illustrating a security information input receiver as implemented with an externally-coupled and removable TIM 300 in accordance with an embodiment of the invention for user authentication of a removable data storage device (RDSD). In this embodiment, RDSD 108 comprises disk storage device 116, RDSD enclosure 202, input/output (I/O) interface module 204, external interface 206, and input receiver interface 212. Input/output (I/O) interface module 204 is externally coupled to input receiver interface 212 and RDSD security information input receiver 208. Input receiver interface 212 comprises a TIM interface 124 further comprising externally-coupled and removable TIM 326, which comprises non-volatile storage medium 128, operable to securely store passwords, digital keys, digital certificates and other security mechanisms. In one embodiment, externally-coupled and removable TIM 326 is coupled to TIM interface 124 by physical contacts. Disk storage device 116 further comprises a plurality of data files 118, one or more authentication files 120, and one or more authorization files 122. RDSD security information input receiver 208 comprises keypad 214 display screen 216, and external card slot 310.

In an embodiment of the invention, the RDSD 108 is first connected to an information handling system. The removable TIM 326 is then externally coupled to TIM interface 124 through external card slot 310. The coupling results in the removable TIM 326 generating user prompts being on display screen 216 requesting predetermined user actions such as entering required authentication or authorization codes using keypad 214. Once the requested codes have been entered using keypad 214, externally-coupled and removable TIM 326 initiates comparison and authentication operations to authenticate the user using the entered codes and the passwords, digital keys, digital certificates and other security mechanisms securely stored in non-volatile storage medium 128.

If the user is successfully authenticated, then authentication of the RDSD 108 to the information handling system begins with the externally-coupled and removable TIM 326 initiating comparison and authentication operations using the contents of one or more authentication files 120 and the passwords, digital keys, digital certificates and other security mechanisms securely stored in non-volatile storage medium 128. Cryptographic operations familiar to those of skill in the art are then performed by the externally-coupled and removable TIM 326 to authenticate RDSD 108. If successful, the externally-coupled and removable TIM 326 conveys a message asserting the authenticity of RDSD 108 to the predetermined information handling system and visual acknowledgement is provided to the user via display screen 216. In one embodiment, the authenticity of applications (e.g., their associated software license) comprising the system is validated by the externally-coupled and removable TIM 326 performing similar comparison and authentication operations. Once authenticated, the externally-coupled and removable TIM 326 conveys a message asserting the authenticity of the software applications to the user via display screen 216.

Once the RDSD 108 has been authenticated, the externally-coupled and removable TIM 326 performs similar comparison and cryptographic operations with the contents of one or more authorization files 122 to authorize the information handling system's access and usage of the plurality of data files 118. In one embodiment of the invention, the externally-coupled and removable TIM 326 performs other cryptographic operations to determine whether the integrity of data files 118 has been compromised. Their integrity status is then digitally conveyed to the information handling system and visually displayed to the user via display screen 216. In another embodiment, removal of the externally-coupled TIM 326 from external card slot 310 results in a loss of connection to the TIM interface 124 and prevents the information handling system from accessing the plurality of data files 118 comprising RDSD 108.

Figure 4:
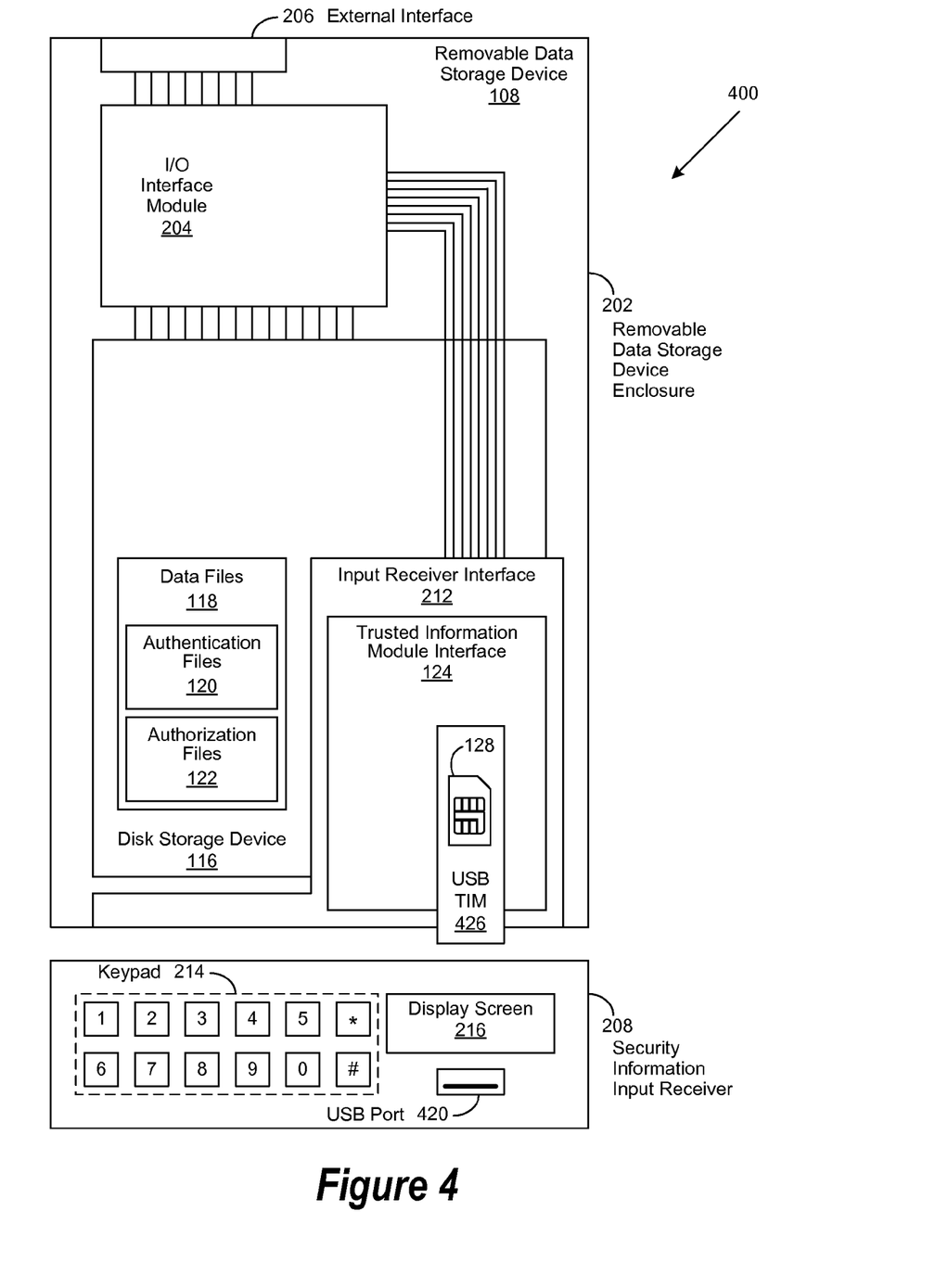
FIG. 4 is a generalized block diagram illustrating a security information input receiver as implemented with a removable universal serial bus (USB) TIM in accordance with an embodiment of the invention for user authentication of an RDSD.

FIG. 4 is a generalized block diagram illustrating a security information input receiver as implemented with a universal serial bus (USB) enabled TIM 400 in accordance with an embodiment of the invention for user authentication of a removable data storage device (RDSD). In this embodiment, RDSD 108 comprises disk storage device 116, RDSD enclosure 202, input/output (I/O) interface module 204, external interface 206, and input receiver interface 212. Input/output (I/O) interface module 204 is externally coupled to input receiver interface 212, which in turn is coupled to security information input receiver 208. Input receiver interface 212 comprises the TIM interface 124 further comprising USB-enabled TIM 426, which comprises non-volatile storage medium 128, operable to securely store passwords, digital keys, digital certificates and other security mechanisms. Disk storage device 116 further comprises a plurality of data files 118, one or more authentication files 120, and one or more authorization files 122. Security information input receiver 208 comprises keypad 214 display screen 216, and USB port 420.

In an embodiment of the invention, the RDSD 108 is first connected to an information handling system. The USB-enabled TIM 426 is then inserted into USB port 420 and is coupled to TIM interface 124. The coupling results in the USB-enabled TIM 426 generating user prompts being displayed on display screen 216 requesting predetermined user actions such as entering required authentication or authorization codes using keypad 214. Once the requested codes have been entered using keypad 214, the USB-enabled TIM 426 initiates comparison and authentication operations to authenticate the user using the entered codes and the passwords, digital keys, digital certificates and other security mechanisms securely stored in non-volatile storage medium 128.

If the user is successfully authenticated, then authentication of the RDSD 108 to the information handling system begins with the USB-enabled TIM 426 initiating comparison and authentication operations using the contents of one or more authentication files 120 and the passwords, digital keys, digital certificates and other security mechanisms securely stored in non-volatile storage medium 128. Cryptographic operations familiar to those of skill in the art are then performed by the USB-enabled TIM 426 to authenticate RDSD 108. If successful, the USB-enabled TIM 426 conveys a message asserting the authenticity of RDSD 108 to the predetermined information handling system and visual acknowledgement may be provided to the user via display screen 216. In one embodiment, the authenticity of applications (e.g., their associated software license) comprising the system is validated by the USB-enabled TIM 426 performing similar comparison and authentication operations. Once authenticated, the USB-enabled TIM 426 conveys a message asserting the authenticity of the software applications to the user via display screen 216.

Once the RDSD 108 has been authenticated, the USB-enabled TIM 426 then performs similar comparison and cryptographic operations with the contents of one or more authorization files 122 to authorize the information handling system's access and usage of the plurality of data files 118. In one embodiment of the invention, the USB-enabled TIM 426 performs other cryptographic operations to determine whether the integrity of data files 118 has been compromised. Their integrity status is then digitally conveyed to the information handling system and visually displayed to the user via display screen 216. In another embodiment, removal of the USB-enabled TIM 426 from USB port 420 results in a loss of connection to TIM interface 124 and prevents the information handling system from accessing the plurality of data files 118 comprising RDSD 108.

Figure 5:
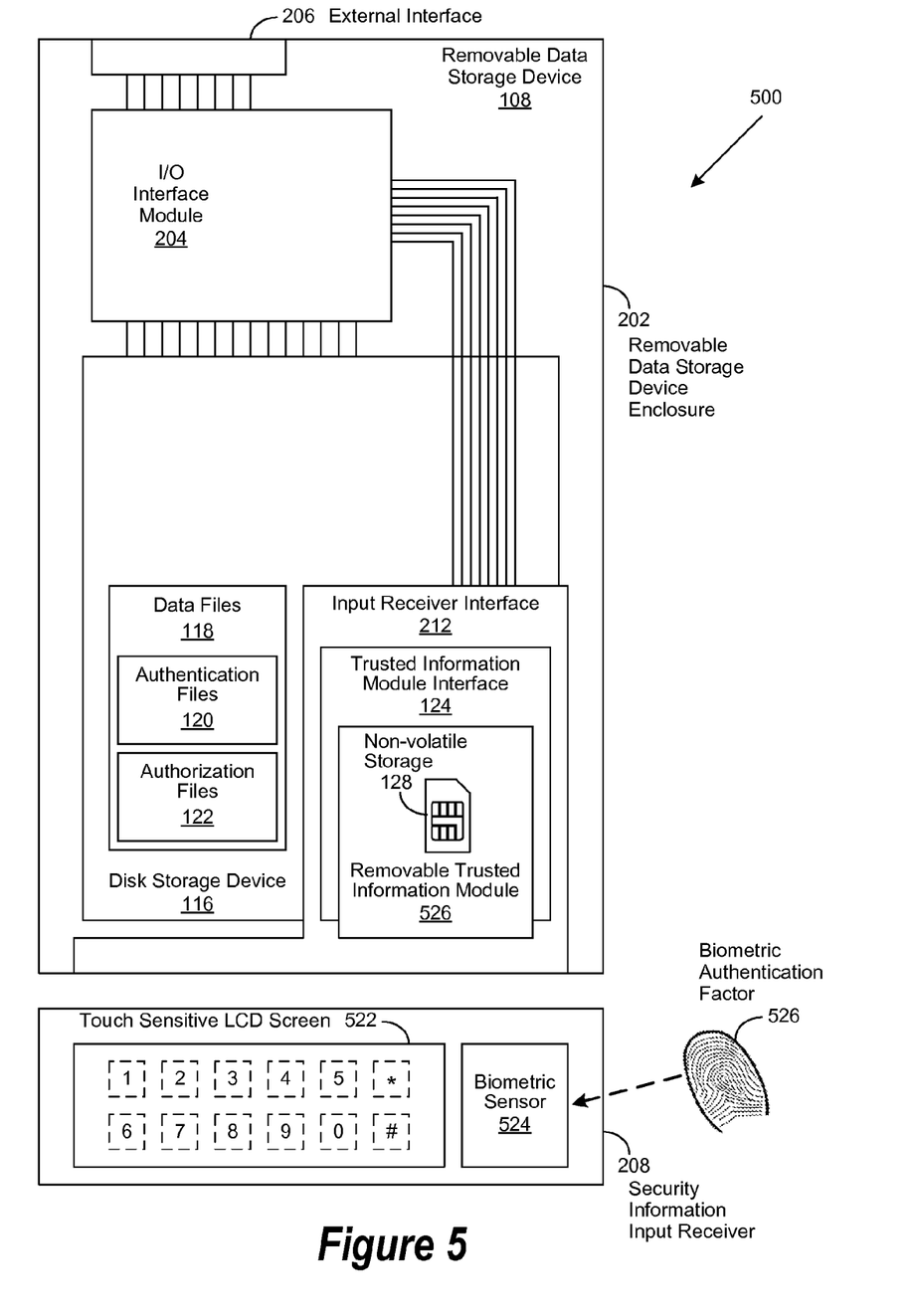
FIG. 5 is a generalized block diagram illustrating a security information input receiver as implemented with a biometric sensor in accordance with an embodiment of the invention for user authentication of an RDSD.

FIG. 5 is a generalized block diagram illustrating a security information input receiver as implemented with a biometric sensor 500 in accordance with an embodiment of the invention for user authentication of a removable data storage device (RDSD). In this embodiment, RDSD 108 comprises disk storage device 116, RDSD enclosure 202, input/output (I/O) interface module 204, external interface 206, and input receiver interface 212. Input/output (I/O) interface module 204 is externally coupled to input receiver interface 212 and RDSD security information input receiver 208. Input receiver interface 212 comprises a TIM interface 124 further comprising the externally-coupled and removable TIM 526, which comprises non-volatile storage medium 128, operable to securely store passwords, digital keys, digital certificates and other security mechanisms. Disk storage device 116 further comprises a plurality of data files 118, one or more authentication files 120, and one or more authorization files 122. RDSD security information input receiver 208 comprises touch sensitive screen 522, and biometric sensor 524, operable to receive input from a biometric authentication factor 526.

In an embodiment of the invention, the RDSD 108 is first connected to an information handling system. Biometric authentication factor 526 is then applied to biometric sensor 524, which activates externally-coupled and removable TIM 526. The activation results in the externally-coupled and removable TIM 526 generating user prompts, which are displayed on touch sensitive screen 522 requesting predetermined user actions such as entering required authentication or authorization codes. Once the requested codes have been entered using touch sensitive screen 522, externally-coupled and removable TIM 526 initiates an authentication operation using the entered codes and the passwords, biometric authentication factor 526, and digital keys, digital certificates and other security mechanisms securely stored in non-volatile storage medium 128 to authenticate the user.

If the user is successfully authenticated, then authentication of the RDSD 108 to the information handling system begins with the externally-coupled and removable TIM 526 initiating an authentication operation using the contents of one or more authentication files 120 and the passwords, digital keys, digital certificates and other security mechanisms securely stored in non-volatile storage medium 128. Cryptographic operations familiar to those of skill in the art are then performed by the externally-coupled and removable TIM 526 to authenticate RDSD 108. If successful, the externally-coupled and removable TIM 526 conveys a message asserting the authenticity of RDSD 108 to the predetermined information handling system and visual acknowledgement is provided to the user via touch sensitive screen 522. In one embodiment, the authenticity of applications (e.g., their associated software license) comprising the system is validated by the externally-coupled and removable TIM 526 performing similar comparison and authentication operations. Once authenticated, the externally-coupled and removable TIM 526 conveys a message asserting the authenticity of the software applications to the user via display screen 216.

Once the RDSD 108 has been authenticated, the externally-coupled and removable TIM 526 then performs similar comparison and cryptographic operations with the contents of one or more authorization files 122 to authorize the predetermined information handling system's access and usage of the plurality of data files 118. In one embodiment of the invention, the externally-coupled and removable TIM 526 performs other cryptographic operations to determine whether the integrity of data files 118 has been compromised. Their integrity status is then digitally conveyed to the predetermined information handling system and visually displayed to the user via touch sensitive screen 522.

Figure 6:
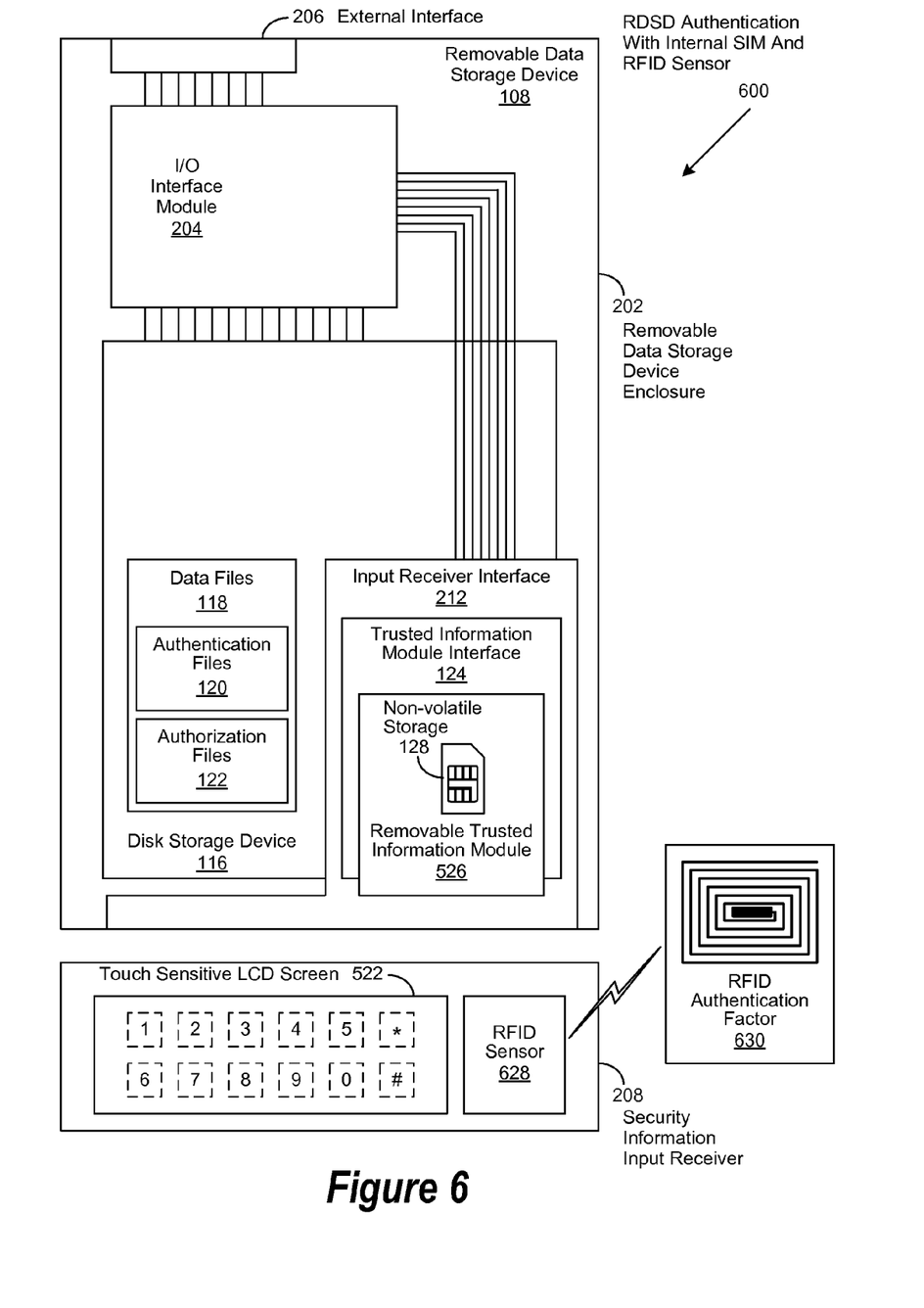
FIG. 6 is a generalized block diagram illustrating a security information input receiver as implemented with a radio frequency identification device (RFID) identity module (RIM) in accordance with an embodiment of the invention for user authentication of an RDSD.

FIG. 6 is a generalized block diagram illustrating a security information input receiver as implemented with a radio frequency identification device (RFID) identity module (RIM) 600 in accordance with an embodiment of the invention for user authentication of a removable data storage device (RDSD). In this embodiment, RDSD 108 comprises disk storage device 116, RDSD enclosure 202, input/output (I/O) interface module 204, external interface 206, and input receiver interface 212. Input/output (I/O) interface module 204 is externally coupled to input receiver interface 212 and RDSD security information input receiver 208. Input receiver interface 212 comprises a TIM interface 124 further comprising an externally-coupled and removable TIM 526, which comprises non-volatile storage medium 128, operable to securely store passwords, digital keys, digital certificates and other security mechanisms. Disk storage device 116 further comprises a plurality of data files 118, one or more authentication files 120, and one or more authorization files 122. RDSD security information input receiver 208 comprises touch sensitive screen 522, and RFID sensor 628, operable to receive input from a RFID authentication factor 630.

In an embodiment of the invention, the RDSD 108 is first connected to an information handling system. RFID authentication factor 630 is then applied to RFID sensor 628, which activates the externally-coupled and removable TIM 526. The activation results in the externally-coupled and removable TIM 526 generating user prompts, which are displayed on touch sensitive screen 522 requesting predetermined user actions such as entering required authentication or authorization codes. Once the requested codes have been entered using touch sensitive screen 522, externally-coupled and removable TIM 526 initiates an authentication operation using the entered codes and the passwords, RFID authentication factor 630, and digital keys, digital certificates and other security mechanisms securely stored in non-volatile storage medium 128 to authenticate the user.

If the user is successfully authenticated, then authentication of the RDSD 108 to the information handling system begins with the externally-coupled and removable TIM 526 initiating an authentication operation using the contents of one or more authentication files 120 and the passwords, digital keys, digital certificates and other security mechanisms securely stored in non-volatile storage medium 128. Cryptographic operations familiar to those of skill in the art are then performed by the externally-coupled and removable TIM 526 to authenticate RDSD 108. If successful, the externally-coupled and removable TIM 526 conveys a message asserting the authenticity of RDSD 108 to the predetermined information handling system and visual acknowledgement is provided to the user via touch sensitive screen 522. In one embodiment, the authenticity of applications (e.g., their associated software license) comprising the system is validated by the externally-coupled and removable TIM 526 performing similar comparison and authentication operations. Once authenticated, the externally-coupled and removable TIM 526 conveys a message asserting the authenticity of the software applications to the user via display screen 216.

Once the RDSD 108 has been authenticated, the externally-coupled and removable TIM 526 then performs similar comparison and cryptographic operations with the contents of one or more authorization files 122 to authorize the predetermined information handling system's access and usage of the plurality of data files 118. In one embodiment of the invention, the externally-coupled and removable TIM 526 performs other cryptographic operations to determine whether the integrity of data files 118 has been compromised. Their integrity status is then digitally conveyed to the predetermined information handling system and visually displayed to the user via touch sensitive screen 522.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A security system for a removable data storage device (RDSD), comprising:
   an information handling system comprising a processor, the processor accessing a plurality of data files stored in said RDSD;
   a trusted information module (TIM) comprising a non-volatile storage medium operable to securely store security credentials, wherein said security credentials are not associated with a user; and
   one or more hardware or software security information input receivers;
   wherein said TIM initiate initiates executable software authentication and authorization processes to:
   authenticate said RDSD to said information handling systems, wherein said executable software authentication and authorization processes are performed using said security credentials without user input of additional authentication or authorization information; and
   use said security credentials and predetermined user identity verification information received from said hardware or software security information input receivers to authenticate a user, said RDSD and said one or more information handling systems to each other; and,
   convey a message via the TIM to the one or more information handling systems asserting authenticity of the RDSD; and wherein
   said non-volatile storage medium securely stores passwords, digital keys, digital certificates and other security mechanisms;
   said non-volatile storage medium comprises a removable smart card to securely communicate trusted information using physical contacts or a removable hardware device to securely communicate trusted information using a universal serial bus (USB) connection;
   said predetermined user identity verification information comprises two or more received user identity verification factors to authenticate said RDSD, said information handling system, and said user to each other; and,
   said predetermined user identity verification information comprises two or more received user identity verification factors to authorize predetermined access to said plurality of data files.

2. The system of claim 1, wherein said user identity verification factors are manually entered by a user using said hardware or software security information input receivers.

3. The system of claim 2, wherein said user identity verification factors are entered using a radio frequency identification device (RFID) input receiver.

4. The system of claim 2, wherein said user identity verification factors are entered using a biometric input receiver.

5. The system of claim 1, wherein said user identity verification factors are automatically entered by a user using said hardware or software security information input receivers.

6. A method for securing information stored in a plurality of data files on a removable data storage device (RDSD), comprising:
   storing security credentials on a trusted information module (TIM) comprising a non-volatile storage medium, wherein said security credentials are not associated with a user; and
   using hardware or software security information input receivers to receive user identity verification information from a user;
   initiating executable software authentication and authorization processes using said TIM to:
   authenticate said RDSD to an information handling system, wherein said executable software authentication and authorization processes are performed using said security credentials without user input of additional authentication or authorization information; and
   use said security credentials and predetermined user identity verification information received from said hardware or software security information input receivers to authenticate a user, said RDSD and said information handling system to each other; and, convey a message via the TIM to said information handling system asserting authenticity of the RDSD; and wherein said non-volatile storage medium securely stores passwords, digital keys, digital certificates and other security mechanisms;

said non-volatile storage medium comprises a removable smart card to securely communicate trusted information using physical contacts or a removable hardware device to securely communicate trusted information using a universal serial bus (USB) connection;

said predetermined user identity verification information comprises two or more received user identity verification factors to authenticate said RDSD, said information handling system, and said user to each other; and, said predetermined user identity verification information comprises two or more received user identity verification factors to authorize predetermined access to said plurality of data files.

7. The method of claim 6, wherein said user identity verification factors are manually entered by a user using said hardware or software security information input receiver.

8. The method of claim 7, wherein said user identity verification factors are entered using a radio frequency identification device (RFID) input receiver.

9. The method of claim 7, wherein said user identity verification factors are entered using a biometric input receiver.

10. The method of claim 6, wherein said user identity verification factors are automatically entered by a user using said hardware or software security information input receiver.

* * * * *